Aug. 28, 1945.  H. STEINER  2,383,626

CYLINDER FOR INTERNAL-COMBUSTION ENGINES

Filed Aug. 25, 1943

INVENTOR
HANS STEINER
BY
Pennie, Davis, Marvin & Edmonds
ATTORNEYS

Patented Aug. 28, 1945

2,383,626

UNITED STATES PATENT OFFICE 2,383,626

CYLINDER FOR INTERNAL-COMBUSTION ENGINES

Hans Steiner, Winterthur, Switzerland, assignor to Sulzer Freres, Société Anonyme, Winterthur, Switzerland Application August 25, 1943, Serial No. 499,918
In Switzerland November 16, 1942

5 Claims. (Cl. 123—193)

The invention relates to a cylinder, in particular for internal combustion engines, and consists in that a casing, separate from the cylinder and surrounding the ports, is supported in such a way that, when radial expansion of the casing occurs, displacement of the centre of the casing away from the cylinder axis is prevented.

The invention offers the advantage that the position of the cylinder, even when high temperatures prevail in the walls of the casing, is not adversely affected either by the expansion of the casing and connecting pipes or by gas pressures. A further advantage is that a simple and reliable metallic packing can be provided between the cylinder or cylinder liner and the separate casing. If the casing were supported otherwise, it would be necessary to provide between cylinder and casing a packing which would permit of considerable displacement between cylinder and casing.

In the drawing two examples of execution of the invention are represented diagrammatically.

Figure 1:
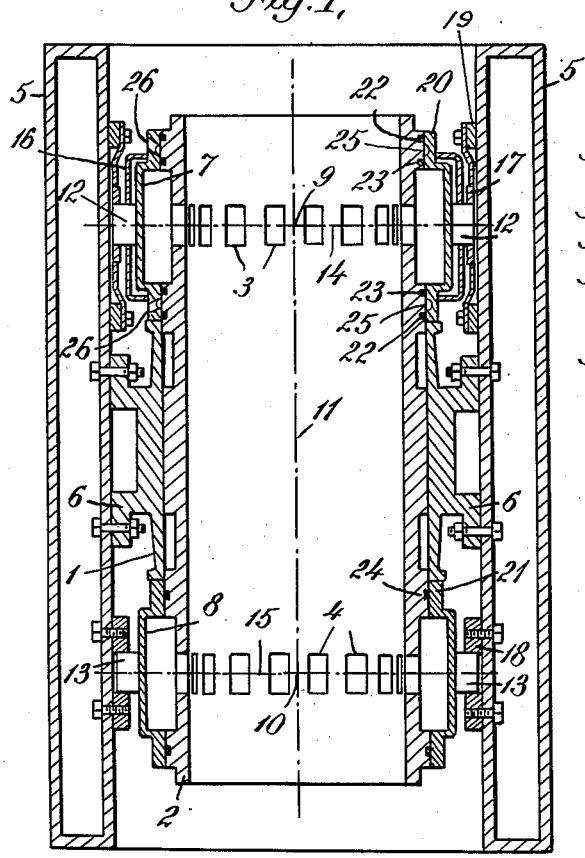
Fig. 1 shows a longitudinal section through an internal combustion engine cylinder, Fig. 2 a cross-section through the cylinder and through the casing surrounding the exhaust ports.

In Fig. 1 is shown the working cylinder 1 of, for example, a free-piston power-gas engine not otherwise represented in the drawing. The cylinder with its liner 2, which is provided with exhaust ports 3 and air inlet ports 4, is attached to the supporting frame 5 by means of flanges 6. Ports 3 and 4 are surrounded by casings 7 and 8, which are arranged separate from cylinder 1 and liner 2.

The casings 7 and 8 are fitted in such a way that during their radial expansion displacement of casing centres 9 and 10 from the cylinder axis 11 is prevented, two pairs of pins 12 and 13 being arranged for this purpose centrally and symmetrically in the central planes 14 and 15 of casings 7 and 8 respectively. The pins 12 pass through the cooling-jacket 16 of casing 7, the jacket being fitted tight against pins 12, for example by a welded joint.

Pins 12 and 13 are placed in plates 17 and 18 so as to be movable in their own axial direction and transverse to the cylinder axis 11, plates 17 differing from plates 18, which lie direct against frame 5, in being connected to frame 5 by means of rails 19. In this way they are able to yield in the axial direction of pins 12 and thus in a direction running transverse to the cylinder axis 11.

The flanges 20 and 21 of casings 7 and 8 are made gas-tight against liner 2 by means of the packings 22, 23 and 24, for instance by rubber rings in grooves in liner 2, so that liner 2 can move freely in casings 7 and 8 in the direction of the axis 11. Between packings 22 and 23 compressed air is let into groove 25 through pipe 26 in order to prevent the escape of exhaust gases into the engine-room.

If upon becoming heated when in service the casings 7 and 8 expand radially, then the pins 12 and 13 are displaced in plates 17 and 18. As, however, casings 7 and 8 are so fitted on frame 5 as to yield in a radial direction, no displacement of the casing centres 9 and 10 relative to the cylinder axis 11 can take place, nor can the expansion have any effect on the cylinder 1.

Figure 2:
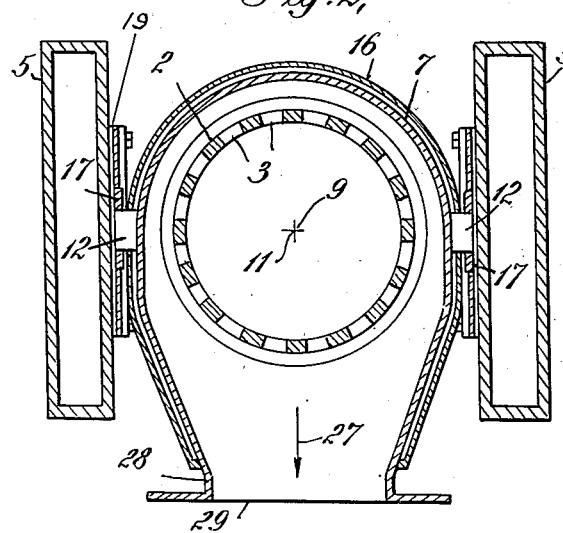

It can be seen from Fig. 2 that the direction in which the pins 12 fitted to the casing are displaced when the casing expands radially runs transverse to the direction 27 of the flow of exhaust gases out of the exhaust branch 28. If the exhaust branch 28 is connected to the exhaust pipe by means of an expansion sleeve, the casing 7 is subjected to a gas pressure corresponding to the cross-section 29 of the outlet of exhaust branch 28, the pressure being exerted in the opposite direction to the arrow 27 and thus transverse to the direction of displacement of pin 12. In this way a displacement of the casing centre 9 from the cylinder axis 11 by gas pressure is obviated.

Figure 3:
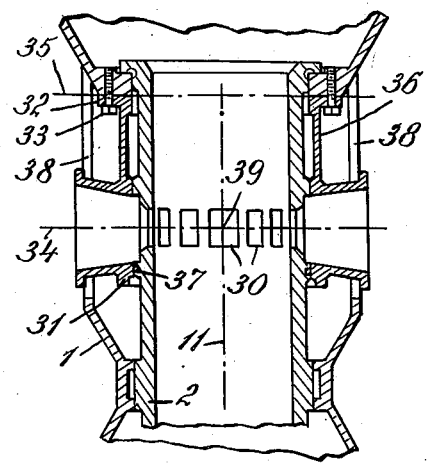
Figs. 3 and 4 show longitudinal sections of a cylinder for a further example of execution.
Figure 4:
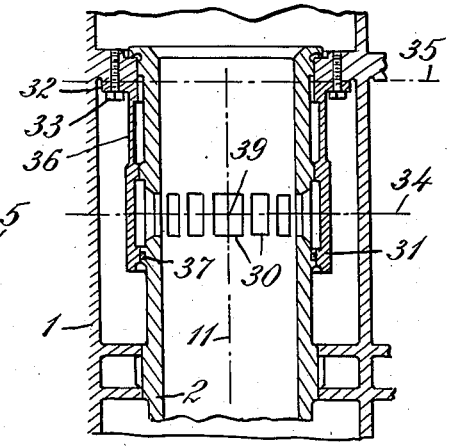

In Figs. 3 and 4 the ports 30 of the liner 2 in cylinder 1 are surrounded by casing 31 which has a flange 32 for fixing purposes, this flange being attached by bolts 33 to the cylinder 1 and situated in a plane 35 parallel to the central plane 34 of casing 31 and perpendicular to cylinder axis 11. The flange 32 is connected to the casing 31 by the connecting piece 36 which surrounds liner 2 and extends in the longitudinal direction of the liner. On the inner circumference 37 of casing 31 a metallic packing is provided against liner 2, or a plastic packing may be used. Cylinder 1 is provided with openings 38 (Fig. 3).

At erection the casing 31 is first introduced through one of the two openings 38 in cylinder 1 and is made fast by means of bolts 33. Next, the liner 2 is inserted in the cylinder 1 and in the casing 31 from above. At dismantling this procedure is reversed.

If as a result of becoming heated the casing 31 expands radially, the fact that casing 31 is fixed by flange 32 guarantees that this radial expansion can take place unhindered by the expansion of the cylinder or cylinder jacket 1 and of the cylinder liner 2, since the connecting piece 36 provides the required radial flexibility relative to flange 32. A displacement of the casing centre 9 away from the cylinder axis 11, however, does not take place, as the flange 32 is disposed in a plane 35 parallel to the central plane 34 of casing 31. Here too, then, the expansion of casing 31 has no reaction on liner 2. An expansion of the connecting piece 36 causes only a slight depression of casing 31, but no displacement of casing centre 39 away from the cylinder axis 11.

In internal combustion engines the casings 7 and 8 (Figs. 1 and 2) in general surround the cylinder liner 2. They may, however, be disposed around the cylinder or cylinder jacket 1, for instance when there is no separate liner and the cylinder running surfaces and the jacket form one piece.

This form of casing support is of special advantage in internal combustion engines with a high pressure in the exhaust pipe, such as free-piston power-gas generators. At the high exhaust-gas temperatures prevailing in such engines expansion pieces are required in the exhaust pipe, but the supporting means is rigid with respect to the back-pressure of the power-gas pipe, since the extended axis of the connecting branch to the power-gas pipe passes through the above-mentioned centre of gravity of the points of support.

The invention is not limited to internal combustion engines but also includes cylinders of other machines and vessels with ports surrounded by a casing, where expansion due to heat has to be considered and a displacement of the cylinder or vessel out of its axis requires to be obviated.

I claim:

1. In an internal combustion engine the improvement which comprises a cylinder attached to a supporting frame, a cylinder liner inside the cylinder, intake ports in the liner, exhaust ports in the liner longitudinally spaced from the intake ports, a casing surrounding the intake ports, another casing surrounding the exhaust ports, and yieldable means connecting each casing to the cylinder, whereby when radial expansion of the casings occur, displacement of the casing centers from the cylinder axis is obviated.

2. An internal combustion engine according to claim 1 which comprises a plurality of pins in supporting engagement with each casing and the frame, said pins being located centrally and symmetrically in planes at right angles to the axis of the cylinder liner which pass through the ports.

3. An internal combustion engine according to claim 1 which comprises a separate casing surrounding each group of ports, flange means spaced from the ports for connecting each casing to the cylinder, and yieldable means extending in the longitudinal direction of the cylinder axis for connecting the casing to the flange means.

4. An internal combustion engine according to claim 1 which comprises yieldable plate means connected to the engine supporting frame, and means connecting the plates to the casing.

5. An internal combustion engine according to claim 1 which comprises sealing means between the casing and the cylinder liner surrounding the exhaust ports, and port means for supplying air under pressure to the sealing means.

HANS STEINER.